United States Patent [19]

Busch et al.

[11] Patent Number: 5,289,267
[45] Date of Patent: Feb. 22, 1994

[54] ELECTRO-OPTICAL SYSTEM FOR GAUGING SURFACE PROFILE DEVIATIONS

[75] Inventors: Garland E. Busch, Milan; James G. Downward, Ann Arbor; Paul G. Gottschalk, Ann Arbor; Theodore B. Ladewski, Ann Arbor; Charles D. Lysogorski, Dexter, all of Mich.

[73] Assignee: KMS Fusion, Inc., Ann Arbor, Mich.

[21] Appl. No.: 770,885

[22] Filed: Oct. 4, 1991

[51] Int. Cl.⁵ .......................... G01B 11/00; G01J 1/02
[52] U.S. Cl. .................................... 356/394; 356/376; 356/371; 356/243
[58] Field of Search ............... 356/371, 394, 237, 239, 356/376, 446, 243; 250/572, 562

[56] References Cited

U.S. PATENT DOCUMENTS

| | | |
|---|---|---|
| 171,838 | 1/1876 | Munnich . |
| 2,250,521 | 7/1941 | Boeder . |
| 2,438,743 | 3/1948 | Feinbloom . |
| 2,645,971 | 7/1953 | Herbst ................... 356/376 |
| 2,693,735 | 11/1954 | Zehender ............... 356/371 |
| 2,695,544 | 11/1954 | Brenner . |
| 3,891,320 | 6/1975 | Kimura et al. ......... 356/371 |
| 4,049,350 | 9/1977 | Brück .................... 356/239 |
| 4,290,698 | 9/1981 | Milana ................... 358/371 |
| 4,505,585 | 3/1985 | Yoshikawa et al. . |
| 4,878,114 | 10/1989 | Huynh et al. . |
| 4,929,846 | 5/1990 | Mansour . |
| 4,960,999 | 10/1990 | McKean et al. ........ 250/461.1 |

FOREIGN PATENT DOCUMENTS 500892 3/1939 United Kingdom .

Primary Examiner—Richard A. Rosenberger
Assistant Examiner—Hoa O. Pham
Attorney, Agent, or Firm—Dykema Gossett

[57] ABSTRACT

A method and system for gauging deviations of a surface of a test part from a preselected nominal surface profile is disclosed. The system includes a support having a master surface that is substantially a matched or mating surface of the nominal surface profile of the test part and a thin layer of an attenuating medium such as a dye liquid between the master and test surfaces. Electromagnetic radiation is directed through the support and master surface and through the attenuating layer onto the reflective surface of the test part. An image sensor such as a camera is positioned to receive an image of the radiation reflected by the test part surface back through the attenuating layer and support, with the intensity of such radiation across the image varying as a function of the deviation of the test part surface from the nominal surface profile. The sensor output is digitized to form a series of digital signals indicative of the intensity of radiation associated with each location of the reflected image, and the digitized pixel signals are stored in digital electronic memory and/or displayed on a screen. Computer programming corrects the digitized intensity signals for sensor gain, bias and variations in part reflectivity, and presents a quantitative measurement of the deviations in test surface profile from the master surface profile over the entire surface being measured.

31 Claims, 3 Drawing Sheets

ELECTRO-OPTICAL SYSTEM FOR GAUGING SURFACE PROFILE DEVIATIONS

The present invention is generally related to a method and apparatus for determining the trueness of an object from a predetermined geometry. More specifically, this invention is related to a highly automated, electro-optical system for gauging deviations of a surface profile of a test part from a predetermined nominal profile geometry and a method for gauging deviations of such surface profiles. The method and apparatus of this invention are suitable for use with test parts having flat surfaces as well as contoured surfaces.

BACKGROUND OF THE INVENTION

It has heretofore been proposed to estimate flatness of a surface o-n a test part by visually observing reflection through a dye liquid film or layer placed between the test surface and a flat master surface. For example, U.S. Pat. No. 2,695,544 discloses a system consisting of, in order, a pane of glass, a dye layer, and the test part. Light is directed through the pane of glass and into the dye layer. The operator then visually observes the light reflected by the test part surface back through the dye layer and the glass pane. Since the light energy is attenuated as a function of distance traveled through the dye layer, departure of the reflected light from uniform intensity across the image generally indicates a corresponding departure of the test part surface from flatness or parallelism with the surface of the glass pane. This method is limited to a subjective and qualitative estimate of the flatness of the test object. This method is also limited by the visual acuity of the operator which will, of course, vary from operator to operator. This method cannot account for differences in reflectivity of the test part across its surface or for differences in the illumination or for other artifacts. This method is suitable for use only in relatively less-demanding quality control applications where parts are either accepted or rejected depending on their qualitative deviation from a prescribed geometry. This method is generally not suitable for use in the operation, control, and/or modification of a manufacturing process wherein the parts are produced. This method is generally not useful in quality control or other operations where it is necessary to quantitatively determine the deviations of the test part from a prescribed geometry.

It is desirable, therefore, to provide a system and a method for gauging the deviations of a test part from a predetermined nominal profile geometry with enhanced and improved capabilities for precise quantitative measurement of surface deviations over the entire surface of the test part. It is also desirable to provide a system and a method for gauging the deviations of a test part from a predetermined nominal profile geometry with improved measurement resolution that is adapted for use in conjunction with test parts having a wide variety of geometries and optical characteristics. It is also desirable to provide such a system and method that includes facility for compensating against effects of background radiation, variations in illumination intensity, and variations in test part reflectivity. It is also desirable to provide such a system and method that allows for improved control of measurement resolution, and that is readily adapted for automation. The present invention provides a system and method for gauging the deviations of a test part from a predetermined nominal profile geometry which achieves these just described objectives and criteria.

SUMMARY OF THE INVENTION

The present system for gauging deviations of a surface on a test part from a preselected nominal surface geometry includes a support that is essentially transparent to the electromagnetic radiation used and has a master surface that is substantially a matched or mated surface to the preselected nominal surface geometry of the test part. The terms "matched surface" or "mated surface" as employed in the present application mean that the master surface 18 essentially contains the complement image of the prescribed nominal surface geometry which is the desired profile of the test part such that, when the master surface and the test part are brought into adjacent opposition as shown in FIG. 2, the separation between the master surface and the test part will be essentially uniform across the surfaces. For example, if the nominal surface geometry of the test part is flat, the master surface of the support is likewise flat. If the nominal surface of the test part is of convex curved shape, the master surface of the support is of complementary concave curved shape. An essentially non-scattering or low-scattering attenuating medium is placed on the master surface between the test surface and the master surface, with the test part being supportable on the master surface with the surface of the test part opposed to the master surface. The attenuating medium may be a dye fluid or any appropriate medium (fluid, powder, or gas) providing that the medium attenuates the electromagnetic radiation with minimal scattering, and that the medium freely flows into and substantially fills the voids to be gauged between the master surface and the test surface. The test part may be supported by the attenuating fluid (such as a dye fluid) itself or, preferably, by support shims or other mechanical devices to help ensure nominally uniform spacing between the test and master surfaces. The attenuating medium should substantially fill the spaces to be gauged between the master surface and the test part surface.

A source of electromagnetic radiation is positioned to direct such radiation through the support and into the dye fluid. The radiation, preferably in the visible light spectrum, is directed into the dye fluid through the support and master surface. An image recording system is positioned to receive the radiation reflected off the test part and back through the dye fluid and thereby record an image of electromagnetic radiation transmitted from the dye fluid. The intensity of the radiation across the image will vary as a function of the deviations of the test part surface from the nominal geometry. The image received by the image recording system is digitized to form a series of digital signals indicative of intensity of radiation received at sequential picture elements or pixels of the image. An electronic memory receives, stores, and manipulates such digital signals as necessary.

The present invention uses the attenuation of electromagnetic radiation passing through a medium to determine and measure the deviations of a test part from that of the nominal and desired profile geometry. In the case of visible light passing through a dye layer, the light energy is attenuated exponentially as a function of the distance traveled through the dye layer. The measured deviations of the reflected light from uniform intensity (i.e., the variations in intensity of the reflected light across the surface) can be used to calculate the relative deviations of the test part surface from the master surface. The use of suitable calibration standards allows the determination of the absolute deviations of the test part surface from the master surface.

Implementation of the present invention provides a two-dimensional image of the test part surface profile in a form suitable for digital manipulation, processing, and analysis purposes within a computer system using appropriate software techniques. The digital image of the test part surface profile or digital data corresponding to the test part surface profile may be readily displayed or plotted in the form of a two-dimensional image illustrating the deviation profile or, with proper computer enhancement, displayed or plotted in the form of a three-dimensional image illustrating the deviation profile. Or cross-sectional views of the deviation profile can readily be obtained through critical surface areas of the test part. The digital image may also be employed using conventional manufacturing process control techniques to automatically correct a part production process to reduce or eliminate profile deviations in the test part or to correct for variations over time in the part production process due, for example, to wear or variations in the cutting process or tooling members. Digital processing and software techniques may be employed to correct for non-uniform illumination of the test part, distortion and/or gain variations in the imaging camera, non-uniformities in surface reflectivity of the test part, variations in dye characteristics across the image, and other artifacts.

The present invention can be utilized for measuring deviations of surface profiles from a reference profile master under a variety of conditions. For each condition, a preferred wavelength and attenuating medium can be selected that is based on the costs or other considerations desired resolution, tolerances, safety considerations, and the like) relating to the imaging and digitally recording the reflected electromagnetic wave at different wavelengths. For example, to measure deviations on the order of thousandths of an inch, optical frequencies in the visible region and a dye fluid are the presently preferred embodiment of the invention because suitable inexpensive illumination systems and digitizing cameras exist for use in this embodiment. However, if it is desired to measure larger sized surface deviations, microwave radiation might be used as the illuminating radiation with a resistive dielectric fluid as the attenuating medium.

One object of the present invention is to provide a system for gauging deviations of a surface on a test part from a preselected nominal surface geometry using electromagnetic radiation, said system comprising:

(1) a master surface that is a substantially matched surface of the preselected nominal surface geometry and that is essentially transparent to the electromagnetic radiation;

(2) an attenuating medium on the master surface with the test part being supportable on the master surface with the surface of the test part opposed to the master surface such that the attenuating medium substantially fills all the space to be gauged between the master surface and the test part surface;

(3) a source of electromagnetic radiation positioned to direct such radiation through the master surface and into the attenuating medium;

(4) an image sensor positioned to receive an image of electromagnetic radiation transmitted from the attenuating medium;

(5) a digitizer for converting the image from the image sensor into digital signals indicative of the intensity of the radiation at the locations of the image; and (6) digital electronic storage coupled to the digitizer for receiving and storing the digital signals;

whereby the intensity of the transmitted radiation varies across the image as a function of the deviation of the test part surface from the preselected nominal surface geometry.

Another object of the present invention is to provide a method of gauging deviations of a surface on a test part from a preselected nominal surface geometry using electromagnetic radiation and a master surface that is essentially transparent to the electromagnetic radiation and that contains a substantially matched surface of the preselected nominal surface geometry, said method comprising:

(1) forming an attenuating medium layer on the master surface;

(2) placing the test part on the attenuating medium layer such that the surface of the test part is opposed to the corresponding matched surface of the master surface and such that substantially all spaces to be gauged between the test part surface and the master surface are essentially filled with attenuating medium;

(3) passing electromagnetic radiation into the attenuating medium in the direction of the test part surface;

(4) collecting the electromagnetic radiation which is transmitted from the attenuating medium to form an image of the transmitted electromagnetic radiation;

(5) digitizing the image of the transmitted electromagnetic radiation;

(6) storing the digitized image in an electronic storage device associated with a computer; and (7) determining the deviations of the surface of the test part from a preselected nominal surface geometry using computer software techniques;

whereby the intensity of the transmitted electromagnetic radiation varies across the image as a function of the deviation of the test part surface from the preselected nominal surface geometry.

These and other objects of the present invention will be explained in more detail in the following description of the preferred embodiments of the invention with reference to the following drawings.

THE DRAWINGS

DETAILED DESCRIPTION OF THE PREFERRED EMBODIMENTS

Figure 1:
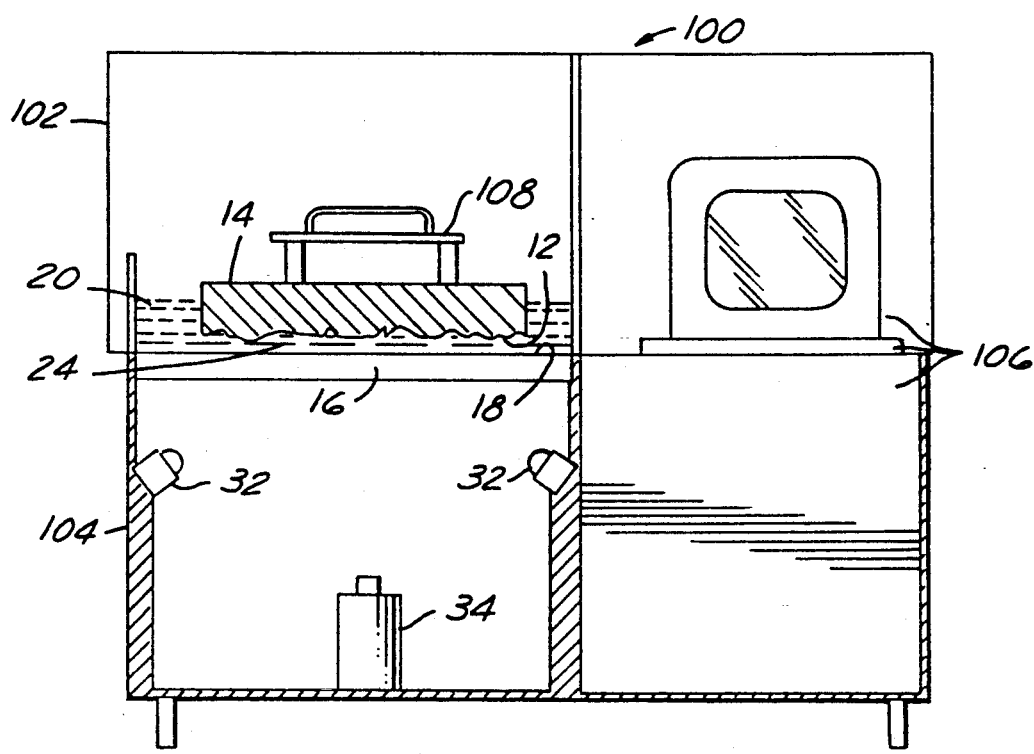
FIG. 1 is a diagram of an inspection station using the gauging system of the invention.
Figure 2:
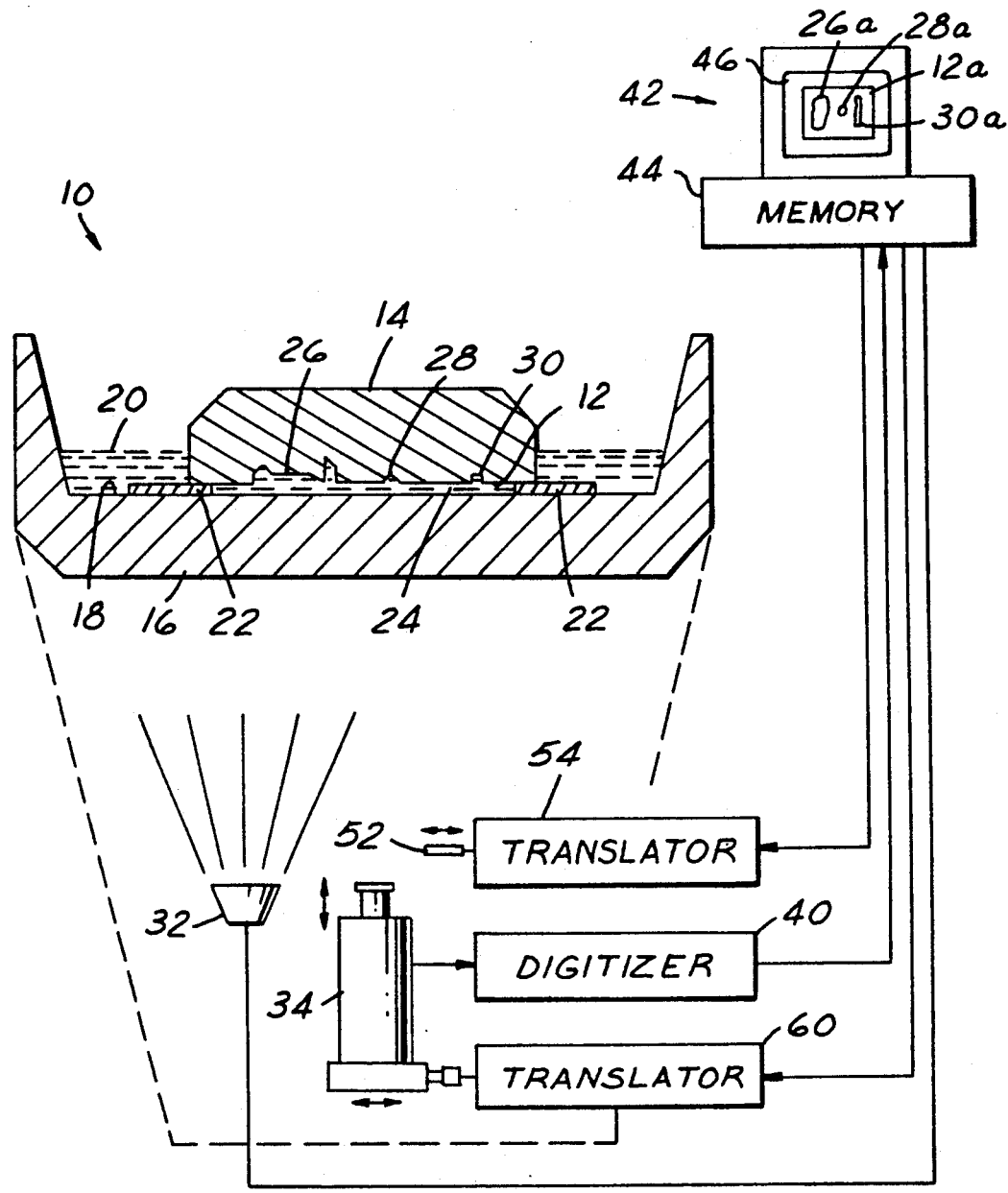
FIG. 2 is a schematic diagram of a gauging system in accordance with a presently preferred embodiment of the invention.

FIG. 1 generally illustrates an inspection station 100 using the gauging system of this invention. The gauging system is shown in more detail and in different embodiments in FIGS. 2 through 5. FIG. 1 shows an inspection station 100 consisting of a test chamber enclosure 102, an electromagnetic source and image sensor compartment 104, and the associated computer work station 106. The computer work station 106 is shown with a display screen, input device (i.e., a keyboard), and a cabinet to contain the associated computer hardware, memory, and interface devices. The test chamber enclosure 102 contains the test part 14 and test surface 12 which is to be gauged for deviations from a preselected nominal surface geometry. Using fixture 108, the test part 14 is lowered into or placed in an attenuating medium 20 using fixture 108 such that there is a thin film 24 of the attenuating medium 20 between the test part surface 12 and the master surface 18 of the master support 16. The master support 16 must be transparent to the electromagnetic radiation used. The master support 16, in this case an optical flat, provides the interface between the test chamber enclosure 102 and the electromagnetic radiation source and image sensor compartment 104. Compartment 104 contains the electromagnetic source 32 and the image sensor 34. In FIG. 1, two electromagnetic radiation sources 32 are used. As shown in FIG. 2, only one electromagnetic radiation source can be used; or, if desired, more than two electromagnetic radiation sources can also be used. As explained in more detail below, electromagnetic radiation from the electromagnetic radiation source 32 is directed through the master support 16 and its master surface 18, into the attenuation film 24, onto test part surface 12, and then back through the attenuating film 24 and master support 16 to the image sensor 34. The distance the electromagnetic radiation travels through the attenuation film 24 is generally equal to twice the distance between the surfaces 12 and 18 at any given point on the surface 12. By appropriate manipulation, the electromagnetic image received at image sensor 34 is converted into digital signals suitable for computer manipulation. Using computer and suitable software techniques via the computer work station 106, the deviations of the test part surface 12 from a preselected nominal geometry can be determined and displayed as detailed below.

As one skilled in the art will realize, the components in FIG. 1 can be reoriented in various ways. For example, the test chamber compartment 102 and the electromagnetic radiation source and image sensor compartment 104 can be rotated 180 degrees relative to each other such that the test part surface 12 would be located below the electromagnetic radiation source 32 and image sensor 34. Or the compartments 102 and 104 can be arranged side-by-side with the master support 16 being essentially a vertical interface between the two compartments (i.e., the test part 14 is located on one side of the master support 16 and the electromagnetic radiation source 32 and the image sensor 34 on the other side). This side-by-side arrangement may be especially useful to eliminate or minimize air bubbles which might otherwise be trapped between the surfaces 12 and 18.

FIG. 2 illustrates a system 10 in accordance with an exemplary but presently preferred embodiment of the invention for gauging or measuring deviations of the surface 12 on a test part 14 from a preselected nominal surface geometry, in this case a flat geometry. System 10 includes a support 16 having a master surface 18 that is manufactured to be a substantially exact mating or matched surface of the nominal surface geometry of test surface 12 (i.e., a flat surface). As noted above, the terms "matched surface" or "mated surface" as employed in the present application mean that the master surface 18 essentially contains the complement image of the prescribed nominal surface geometry which is the desired profile of the test part such that, when the master surface and the test part are brought into position as shown in FIG. 2, the separation between the master surface and the test part will be essentially uniform across the surfaces. In other words, if the prescribed nominal geometry of the test part contains, for example, a bulge in the shape of a pyramid, the waster surface will contain a corresponding depression in the shape of a pyramid. Or if the prescribed nominal geometry of the test part is flat, the master surface will be flat. It is not necessary, however, that the master surface conform exactly in every detail to the prescribed nominal surface geometry of the test part. Variations between the master surface and the prescribed nominal surface geometry can be corrected or accounted for using software techniques.

An attenuation medium 20, preferably a dye liquid, is carried on master surface 18 of support 16. Test part 14 rests on a plurality of shims or spacers 22 that separate master surface 18 from test surface 12 by a nominal distance corresponding to thickness of the shims. It is generally preferred that the shims 22 have the same thickness. In some cases, however, it may be preferred that shims of different thickness are used. Dye liquid 20 thus forms a fluid film or layer 24 between surfaces 12 and 18 and fills the voids and depressions 26, 28, and 30 in surface 12 of test part 14. Generally, the distance between the two surfaces 12 and 18 (i.e., the nominal thickness of the attenuation medium 20) should be minimized. Generally, a separation distance of about 0.01 to 0.05 inches will be satisfactory. Separations of the two surfaces 12 and 18 substantially greater than or less than these limits may, however, be employed.

The attenuation medium 20 should fill the voids, depressions, grooves, and other features to be gauged between the two surfaces 12 and 18. In some instances, they may be imperfections or designed features of the test part which are located in areas of the part that are not critical. If such areas are not to be examined, it is, of course, not necessary that such features be filled with the attenuation medium 20. In many cases, it may even be preferred that such areas (i.e., the non-interest areas) be blocked or masked out to simplify analysis. By masking these areas, the operator can concentrate on the critical areas of interest. Masking can be done with suitable software techniques.

In some instances, air bubbles may become entrapped between the surfaces 12 and 18, especially in pockets 26, depressions 28, or cracks 30 in surface 12 of test part 14. Although it is generally preferred that such air bubbles be minimized, it is not necessary that they be completely eliminated. Such air bubbles can be minimized by appropriate venting channels so that the bubbles can escape, careful orientation of the part as it is placed in the attenuation medium so that entrapment of such bubbles is minimized, vibration of the part or system so that the bubbles can escape, the use of degassed solvents, and the like. As noted above, air bubbles can also be minimized by orienting the compartments 102 and 104 in a side-by-side arrangement with the master support 16 in an essentially vertical orientation.

Figure 3:
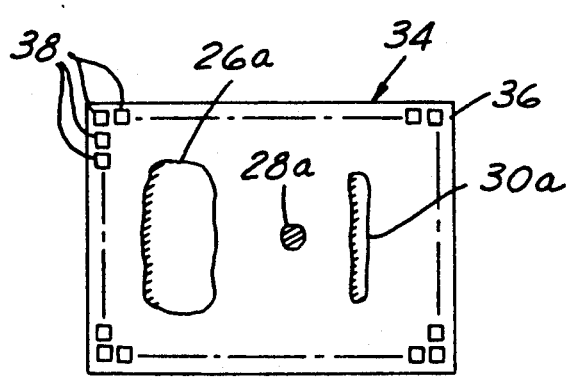
FIG. 3 is a schematic diagram of the test part surface profile image viewed by the camera in FIG. 2.

An electromagnetic radiation source 32 is positioned beneath support 16 and directs light energy through support 16 into film 24 of dye liquid 20 between surfaces 16 and 18. Support 16 is substantially transparent to such light energy from source 32. Light energy from source 32 is therefore incident on surface 12 of test part 14 through support 16 and film 24, and is reflected by the test part surface back through the dye liquid film 24 and the support 16. An image sensor 34 (e.g., a camera) is positioned beneath support 16 adjacent to light source 32, and is oriented with respect to support 16 so as to receive the attenuated reflections from the surface 12. The image sensor 34 must be responsive in a predictable manner to the electromagnetic radiation used, must provide the desired resolution, and must be capable of generating data which can be digitized. Suitable image sensors include vidicon cameras, charge coupled devices (CCDs), image array sensors, and the like. As shown in FIG. 3, image sensor 34 preferably comprises a CCD sensor 36 having a matrix of image sensing elements 38 in a row-and-column array. Each element 38 thus receives a corresponding portion or pixel of the overall image of test part surface 12. Cameras with variable focal lengths or zoom lenses are often preferred because they allow the resolution of the system to be varied relatively simply. In some instances, however, cameras with fixed focal lengths may be preferred. For example, a gauging system dedicated to a manufacturing process producing a single part might not need variable resolution capabilities. Cameras capable of interfacing with the computer and, therefore, being controlled by the computer are especially preferred.

Figure 6:
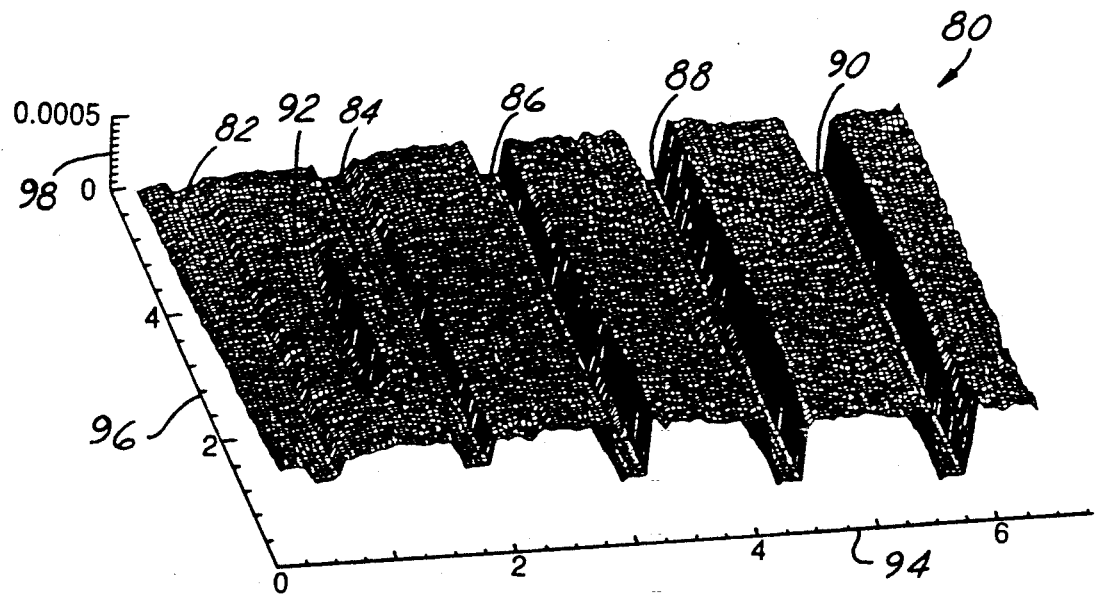
FIG. 6 is a computer-generated image of a standardized test part generated by the gauging system of the invention.

Camera 34 is connected through suitable digitizing electronics 40 to a computer 42 that includes digital memory 44 for receiving and storing the digitized pixel signals from camera 34. Image data is thus stored as numeric data indicating the intensity of the electromagnetic radiation received for each pixel in the matrix of pixels. Computer 42 also includes a screen 46 for displaying to an operator the stored image of test part surface 12. The stored image or data can be displayed, with suitable computer manipulation or enhancement, as shades of gray or in various colors to illustrate deviations from the prescribed nominal geometry. As shown in FIG. 6, the digital data can also be printed or plotted as desired using suitable computer-graphic techniques. The digital data (in either its raw or manipulated forms) can be stored indefinitely to allow for long-term quality control analysis. Such data might be useful, for example, to study failures of critical components where the actual failed components are not readily available (e.g., satellite malfunctions) or to perform long-term statistical analysis of failure or reject rates to pinpoint and correct manufacturing problems.

In operation, light energy from source 32 is incident on surface 12 through support 16 and dye film 24, and is reflected by surface 12 back through the dye film 24 and support 16 to camera 34. Such light energy is attenuated during two passes through dye film 24 as a function of distance traveled through the dye film. Thus, if the film is of uniform thickness, meaning that surfaces 12 and 18 are parallel to each other throughout the image area, the image of test part surface 12 will be of uniform intensity (assuming uniform reflectivity across the surface 12). On the other hand, any pockets 26, depressions 28, or cracks 30 in surface 12 of test part 14 will necessarily increase the distance that the light travels through the dye film, resulting in darker sections 26a, 28a, and 30a in the image 12a of the test part surface as illustrated in FIGS. 2 and 3. In the same way, any outward protrusions in surface 12 of test part 14 (not illustrated in the drawings) will result in a correspondingly reduced distance of light travel through dye film 24 and correspondingly lighter areas of the test surface image. Intensity variations of the image portions 26a, 28a, and 30a are directly related to depth of the corresponding surface irregularities, and the area of each image portion corresponds to the area of the corresponding depression in the overall surface. By accounting for system geometry and illumination variations, the transmission properties of support 16 and attenuation properties of dye fluid 20, the two-dimensional reflected image of test part surface 12 is converted within computer 42 to a digitized two-dimensional map 12a of test part surface contour. Map regions of interest may be selected and magnified by the operator. By suitably calibrating the system in ways to be described, precise quantitative measurements of surface profile deviations can be obtained for analysis and/or control purposes.

Figure 4:
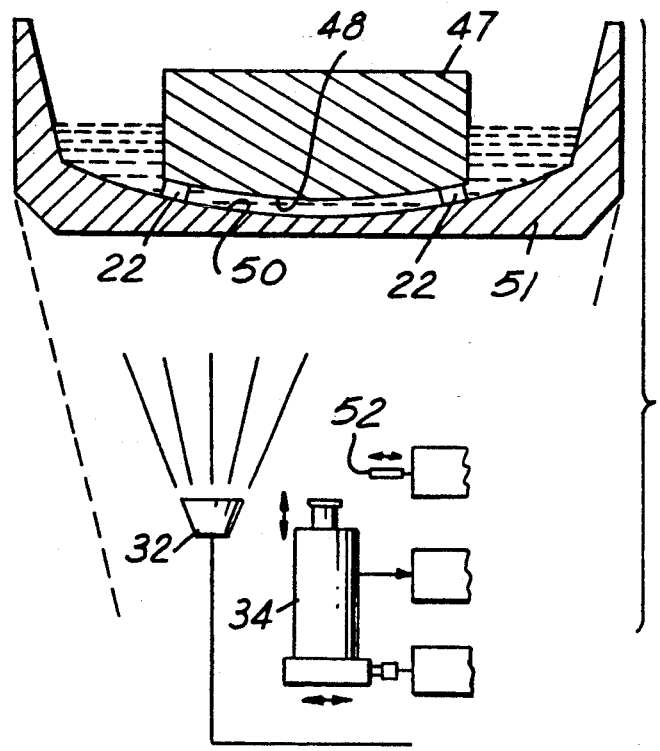
FIG. 4 is a fragmentary schematic diagram of a modified embodiment of the invention.

FIG. 4 illustrates a modified embodiment of the invention for gauging the profile of a test part 47 having a curved test surface 48. The master surface 50 of support 51 is either machined as a matched or mated surface 48 of the nominal desired geometry into a glass support using, for example, a diamond lathe or is cast into a slab of suitable transparent material. In this connection, it will be appreciated that, although master surface 50 (FIG. 4) or 18 (FIG. 2) is employed as a reference surface for gauging purposes, the master surface need not be an exact replica of the nominal test part surface geometry. Small deviations in profile between the nominal surface geometry and the master reference surface can be accommodated by suitably calibrating computer 42 with a dye liquid between the master surface and the test part surface (i.e., surfaces 18 and 12 in FIG. 2 and surfaces 50 and 48 in FIG. 4) using a test part predetermined to possess a surface of desired nominal contour. Such a test part (i.e., one known to have or specifically manufactured to have the predetermined nominal surface geometry) may be retained as a "standard" for routine calibration purposes. If the amount of light reflected from all points on the standard test object surface during this calibration operation is uniform throughout, the thickness of the dye film is uniform and no corrections need to be made. On the other hand, any deviations between the master reference surface and the opposing surface of the standard part will result in a corresponding variation in intensity at one or more pixels of the reflected surface image. By measuring and storing these pixel signals at all points on the surface image, computer 42 effectively captures the correct profile of the standard part with respect to each opposing or corresponding point oil the master surface. The information so obtained can then be employed to offset or bias the corresponding pixel signal or signals during operation of the system so as to accommodate any deviations in the master reference surface.

It cannot always be assumed that the surface of the test part reflects the test illumination uniformly along the entire test part surface. Variations in machining, stains, or material composition can cause the reflectance of the test part surface to vary. The system in accordance with the present invention can, however, be calibrated to accommodate such variations in test part surface reflectivity. In one approach, the reflectivity of the test surface is measured first with clear fluid and then with the same fluid containing a dye. These measurements can then be used to calibrate the varying reflectivity of the test part surface and eliminate the effects caused by the differences in reflectivity. Digitization of the data as provided in the present invention allows such corrections to be made in a straight forward manner using software techniques.

In a second approach as illustrated in FIG. 2, the effects of surface reflectivity are removed by making measurements at two separate average wavelengths $\zeta_1$ and $\lambda_2$. An optical filter 52 is to select the wavelength recorded by the camera. The filter is coupled to a suitable translation device 54 controlled by computer 42 for selectively translating filter 52 into and out of the path of the test part surface image incident on camera 34. A first image of the test part surface is obtained with filter 52 removed from the image path, as illustrated in FIG. 2. This first image is taken at an averaged spectral wavelength $\lambda_1$ to which the dye has a spectrally averaged absorption coefficient $\alpha_1$. A second image is obtained with filter 52 intersecting the image path. This second image is taken at an averaged spectral wavelength $\lambda_2$ to which the dye has a spectrally averaged absorption coefficient $\alpha_2$. For the image obtained with wavelength $\lambda_1$, the measured intensity of the returned or reflected light $I_{m1}$ at a given pixel location is described by the equation $$I_{m1} = I_{i1}\exp(-2\alpha_1 d)R_1$$

where $I_{i1}$ is the effective incident intensity at that pixel location, d is the thickness of the dye layer at that pixel location, and $R_1$ is the reflectivity of the surface at that pixel location. Similarly, the measured intensity of the returned or reflected light $I_{m2}$ for wavelength $\lambda_2$ at that same pixel location is given by the equation $$I_{m2} = I_{i2}\exp(-2\alpha_2 d)R_2$$

where $I_{i2}$ is the effective incident intensity at that pixel location, d is the thickness of the dye layer at that pixel location, and $R_2$ is the reflectivity of the surface at that pixel location. Assuming that the surface reflectivity is independent of wavelength, which is a reasonably good approximation for most metals, $R_1$ equals $R_2$ in the two above equations for each pixel location. The ratio of the measured intensities at the two wavelengths is thus given by the following equation $$I_{m2}/I_{m1} = (I_{i2}/I_{i1})\exp\{-2(\alpha_2-\alpha_1)d\}$$

which no longer involves the reflectivities $R_1$ and $R_2$ of the surface. In this equation, all parameters are known except the ratio $I_{i2}/I_{i1}$ and the distance d to be determined. The ratio $I_{i2}/I_{i1}$ can be determined using a calibration groove or line of know depth (i.e., a shim 22 could contain a groove of known depth). (Alternatively, a photodiode or other light measuring device can be used to directly measure the intensity of the incident radiation at each wavelength and, therefore, determine the unknown ratio $I_{i2}/I_{i1}$ in the above equation.) Solving the above equation for d yields the following equation $$d = \ln\{(I_{m1}I_{i2})/(I_{m2}I_{i1})\}/\{2(\alpha_2-\alpha_1)\}$$

for each pixel location, which is independent of the reflectivity of the surface. This method for correcting for differences in reflectivity of the test surface is ideally suited computer manipulation of the digitized data.

As noted, this just described method for correcting for differences in reflectivity requires making measurements at two separate averaged wavelengths and $\lambda_1$ and $\lambda_2$. In the above described procedure, the filter 52 was moved in and out of the image path between the surface of interest and the camera 34. Other procedures could be used to obtain the data at the two wavelengths. For example, two different filters with different spectral characteristics could be used. Or the filter 52 or different filters could be placed between the light source 32 and the surface of interest. The actual method by which the measurements at the two separate averaged wavelengths $\lambda_1$ and $\lambda_2$ are obtained is not critical.

Figure 5:
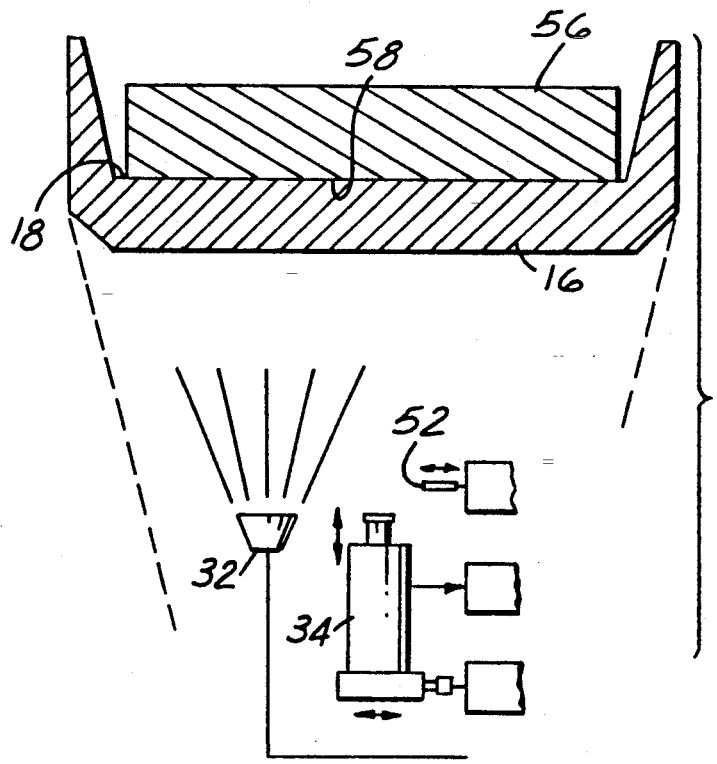
FIG. 5 is a fragmentary schematic diagram of a technique for calibrating the embodiment of the invention illustrated in FIG. 2.

Provision of the test part surface image in digital form suitable for storage and processing in accordance with the present invention readily accommodates calibration. For example, gain associated with each pixel of the surface image can be obtained and employed during operation in a manner analogous to that disclosed in U.S. Pat. No. 4,960,999 which is assigned to the same assignee as the present application and which is hereby incorporated by reference. Because the test part surface may not be uniformly illuminated by the light source 32, or the response of the camera elements may be spatially non-uniform, the system of the present invention preferably includes the capability of correcting for non-uniform illumination and/or detector response. Specifically and as illustrated in FIG. 5, if during a measurement the illumination geometry does not change arid the strength of the illumination is held constant, spacial variations in illumination uniformity are accommodated by placing an object 56 having a surface 58 of known uniform reflectance in place of the test object on master surface 18 without the presence of attenuating fluid. The reflected image can then be measured and used to create a two-dimensional map of correction data to normalize the reflected image pixels during a test operation with the fluid in place. This two-dimensional map of correction data need only be reobtained if system geometry or detector characteristics change. For a system in which the test part surface occupies a large portion of the field of view of the camera, the light path through the dye film may not be perpendicular to the master and test surfaces across the entire image. However, such non-uniform optical path lengths can readily be accommodated through calibration techniques and generation of correction maps in a manner similar to that described immediately above as long as the size of the test part and the physical positioning of the light source, test part, and camera remain constant.

FIG. 6 illustrates the type of results that the present system can generate. A test part was prepared by machining a series of parallel grooves of varying depth in a metal block. In addition, on a portion of the flat surface between two grooves, a shallow, long depression was cut to simulate a surface defect. Using visible light with a dye fluid (i.e., india ink) as the attenuation medium, the image of the surface of this test part was generated using the present invention. A portion of the resulting image is shown in FIG. 6 where the x-axis is labeled 94, the y-axis is labeled 96, and the z-axis is labeled 98. The units for all three axes are given in inches. The five grooves cut in the test surface can clearly be seen: groove 82 is 0.0001 inches deep; groove 84 is 0.0002 inches deep; groove 86 is 0.0003 inches deep; groove 88 is 0.0004 inches deep; and groove 90 is 0.0005 inches deep. The simulated surface defect 92 is seen between grooves 82 and 84. As shown in FIG. 6, depressions as small as 0.0001 inches can readily be observed and measured using the present invention.

For larger parts, it may be desirable to correct the intensity data received at the image sensor for the increase in optical depth toward the edge of the camera's optical field. The corrected intensity $I^c(x,y)$ at a point $(x,y)$ can be found from the following equation:

$$I^c(x,y) = I(x,y)[\cos(\theta)]$$

where $I(x,y)$ is the uncorrected intensity at point $(x,y)$ and $\theta$ is the angle between the camera's optical axis and the light ray from the camera to point $(x,y)$. When the angle $\theta$ is small this correction is also small and can, therefore, be disregarded. Thus, with relatively small parts, which can fit into a narrow portion of the camera's optical field, this correction can usually be omitted except where the highest degree of accuracy is needed. Even for larger parts, the camera can be moved relative to the part's surface and multiple images of the surface taken such that all surfaces of interest are contained and recorded within a narrow portion of the camera's optical field.

As noted above, the various corrections and calibrations can be carried out using conventional software techniques. Such software techniques are well known in the art and need not be specified here in great detail. Generally, although other general procedures could be used, these software techniques involve storing intensity data for each location $(x,y)$ or pixel location in a separate computer register. The corrections or other manipulations would simply involve multiplying the contents of the appropriate register by a suitable factor (i.e., $\cos(\theta)$ of the above equation) or adding or subtracting the appropriate intensity amount for the calibration procedures employed to the contents of the appropriate register. Not all corrections or calibrations described herein will be appropriate or need to be made for every part. After all desired corrections or manipulations are made, the intensity data can be plotted using suitable computer-graphics techniques. Such graphics software is available commercially. For example, suitable graphics software can be obtained from Research Systems Inc. of Boulder, Colo. or from Imaging Technology Inc. of Woburn, Mass. Other graphics software packages can also be used.

The use of electromagnetic energy in the visible spectrum for both illumination of and reflection from the test part surface is generally preferred. However, electromagnetic radiation from the x-ray region to the microwave region may be employed and may, in some instances, be preferred. An attenuating medium using a liquid attenuating dye fluid is generally preferred for use at visible wavelengths. Normally, such an attenuation medium would consists of a dye dissolved in a solvent. Suitable dyes include, for example, india ink, FD&C Blue No. 1, D&C Yellow No. 2, D&C Green No. 6, trans-$\beta$-carotene, and the like. Suitable solvents include, for example, water and organic solvents such as alcohols (e.g., methanol, ethanol, tert-butyl alcohol, amyl alcohol, and the like), transmission fluids, cutting fluids, oils, and the like, provided that the dye used is soluble therein. The attenuating medium could also comprise very fine dye powder or a gas or a liquid with a strong absorption band at the illumination wavelength.

When the reflectivity of the test part surface is low, a fluorescent dye may be employed in dye fluid 20 in place of attenuation dye as previously described. The fluorescent dye may then be illuminated at a suitable wavelength to cause fluorescence in the visible region. The intensity of light incident on the camera from each point in the camera image will be a function of thickness of the fluorescent dye layer and, therefore, the separation between the test and master surfaces. When a fluorescent dye is used, the light observed at the camera is not reflected off the surface but is rather light generated by irradiation of the dye and its resulting fluorescence. Such a system can also be used to gauge deviations from a transparent test part glass) where there will be essentially no reflectance.

The deviations from a nominal surface geometry for transparent parts or low refectivity parts can also be measured by first coating the surface to be gauged with a reflective coating. For example, the surface of a glass part could be coated with a thin silver coating. Such a coating could be removed after the measurements are completed (e.g., a silver coating could be removed by an acid wash). As one skilled in the art will realize, such a coating should be as thin as practical to avoid significant loss of resolution which could result from the coating "filling in" or "bridging" depressions and the like in the surface.

An optical system with variable depth resolution can also be obtained by using a photochromic dye as the attenuating fluid. In such a modification, the sensitivity of the system can be selectively varied by varying the attenuation of the dye. For example, dye opacity can be set to a desired level by varying the illumination of the dye with a bright light source. The light source can then be turned off, and using a lower intensity calibrated illumination system, the reflected image from the test surface can be quickly measured before dye opacity changes significantly.

Variable depth resolution can also be obtained by taking multiple measurements with attenuating medium containing varying amounts of dye. Generally, improved resolution will be obtained for shallow depressions or imperfections with a relatively concentrated dye solution. In such a case, the difference between the nominal distance traveled ($d_n$) and the actual distance traveled ($d_a$) by the light through the attenuating medium is small. By increasing the dye concentration, the difference in travel ($d_a - d_n$) will result in a correspondingly greater difference in light intensity at the camera. For deep depressions or imperfections, greater range can be obtained with less concentrated dyes. For a surface with both shallow and deep depressions or imperfections, it may be preferred to obtain measurements at different dye concentrations. The data generated at the different dye concentrations can be manipulated and combined by software techniques to obtain a single surface profile geometry or map with variable resolution. Image areas of lower interest can be masked out or captured at lower resolution while recording critical areas at higher resolution. In this manner, surface profile images with widely ranging resolutions and details can be generated.

The resolution of the system (especially for the nondepth portion) is determined in large part by camera geometry. For example, if a CCD camera with a $512 \times 512$ element array were used to image a surface 50 cm$\times$50 cm, each pixel would correspond to about 1 mm$^2$ of the surface. The resolution of the system can be decreased or increased as needed using various techniques. For example, a CCD camera with a larger array could be used. If the image array of such a camera was increased to $1024 \times 1024$ elements, each pixel would correspond to about 0.24 mm$^2$ of the same 50 cm×50 cm surface (ie., approximately four fold increase in resolution). Resolution may also be modified by changing the effective focal length of the camera lens. By moving camera 34 closer to the test surface 12 (i.e., moving the camera in the vertical direction in FIG. 2) will increase the resolution but will decrease the percentage of the test part surface that can be observed with a given measurement. To obtain full analysis or coverage of the test part surface it may be necessary, in such a case, to take multiple measurements for a given part. Such multiple measurements could be made by moving the master surface and test part while holding the camera fixed or, preferable, by moving the camera into the desired positions (i.e., moving the camera in the horizontal direction in FIG. 2) using translator 60 (as shown in FIG. 2) to obtain complete coverage of the test part surface. By combining the measurements, analysis of the entire surface can be obtained. Translator 60 can also be used to vary the distance between the camera 34 and the test part surface 12. If desired, separate translators call be used to control movement of the camera in the vertical and horizontal directions. Preferably the translator 60 or translators are under computer control. The effective focal length and, therefore, camera resolution can also be modified by use of a zoom-type lens on the camera 34. Such a lens would eliminate the need for movement of the camera in the vertical direction. Again, it is preferred that the zoom-type lens is under computer control. For these general purposes, camera 34 is coupled to a translator 60, as shown in FIG. 2, which is controlled by computer 42.

If it is desired to measure the flatness of the surface of a machined part to high tolerances, an optical flat can be used as the master reference surface. In order to protect the optical surface— which is generally relatively expensive—from potential damage caused by placing a machined part in contact with the optical surface, a plurality of thin masks, shims, or spacers 22 may be placed between the two objects. These shims 22 would typically be placed between the optical surface and the surface to be measured at known fixed points at which surface deviations do not need to be measured. Such shims 22 are illustrated in FIG. 2. In some cases it may not be possible to locate the shims at positions where surface deviations do not need to be measured. In such cases, two different measurements can be made with the shims at different positions to obtain complete coverage of the surface of interest. Alternatively, a jig system that contains mechanical stand-offs or a mechanical fixture 108 (see FIG. 1) can be used to hold the part and prevent the object's surface from coming into contact with the surface of the optical flat.

Generally, however, shims 22 will be preferred due to their simplicity and their possible use as calibration markers. Such calibration markers can consist of grooves or slots of known and uniform depth cut or machined directed into the shims. Or grooves of variable depth can be used where the depth of the groove at various locations along the groove is precisely known. In addition to providing for general calibration of the apparatus, such calibration markers can, as noted above, be used to provide the necessary calibrations used in eliminating the effect of varying reflectance of the surface.

As noted above, optical flats are relatively expensive to prepare and can be damaged if the optical flat and the test part surfaces come into contact. Shims 22, as noted above, are one way to minimize damage to the optical flat used as the master surface. As one skilled in the art will realize, however, the master surface will eventually be damaged during use and the probability of damage will increase as the number of parts tested increases. Another way in which to minimize damage to the optical flat is to simply eliminate its use as the master surface. Rather a commerical-grade glass plate ( @., float plate glass) can be used as the master surface and the optical flat can be used as a "standard" test part to calibrate the glass plate. By placing the "standard" test part on the master surfaces, preferably with shims 22 supporting the "standard" test part, the differences between the glass plate and the optical flat can be measured and stored in the computer. By measuring actual test parts against the glass plate and using the stored optical flat calibration data, the actual test parts can be compared to the optical flat without exposing the optical flat "standard" test part to potential damage. Recalibration using the "standard" test part will be necessary from time to time to simply check the system's operating characteristics or whenever the glass plate master surface is replaced. In any event, exposure of the relatively expensive optical flat test part to potential damage will be significantly reduced.

Generally, as noted above, it is preferred that the electromagnetic radiation used is in the visible portion of the spectrum. Other forms of electromagnetic radiation can be used and in some cases may be preferred. For example, microwave radiation can be used to gauge both exterior and interior surfaces of complex metal parts (such as a machined mold or a casting). To use microwave radiation, a gauge block or die is machined from a dielectric material that is highly transmissive at the microwave frequency being used. This gauge block is machined to have exterior and interior surfaces that are nearly a matched surface of the object being measured. The exact dimensions of the gauge block are chosen so that the gauge fits closely against (and inside if need be) the surfaces of the object being tested. The dielectric gauge block is then fitted next to placed against or into as is appropriate) the metal surfaces to be measured. The dielectric gauge block is irradiated with microwaves that transmit through the dielectric and onto the metal surfaces. The strength of the signal reflected from all points (interior and exterior) on the object is first measured with a microwave detection system. Next, a partially conductive fluid ( @., a dielectric fluid containing some carbon powder) is placed between the gauge block and the test object, the gauge block and the test object are again fitted together, and the dielectric gauge block is again irradiated with microwaves. The microwaves transmit through the dielectric, are attenuated by the resistive dielectric fluid, are reflected back from the metal surface, are attenuated again by the resistive fluid, and finally propagate back out through the dielectric gauge block. The strength of the microwave signals reflected from each point (interior and exterior) on the test object is measured and digitized. Using the intensity of signal measured at each point on the test object surface, the signal attenuation can determined. From the attenuation, the separation (thickness of the layer of attenuating fluid) at all surface points between the gauge block and the test object is determined. By comparing the measured separation with the design specifications for the test object, deviations in the shape of a manufactured object from its design specifications are directly measured.

We claim:

1. A system for gauging deviations of a surface on a test part from a preselected nominal surface geometry using electromagnetic radiation, said system comprising:
   (1) a master surface that is substantially a matched surface of the preselected nominal surface geometry and that is essentially transparent to the electromagnetic radiation;
   (2) an attenuating medium on the master surface with the test part being supportable on the master surface with the surface of the test part opposed to the master surface such that the attenuating medium substantially fills all space to be gauged between the master surface and the test part surface;
   (3) a source of electromagnetic radiation positioned to direct such radiation through the master surface and into the attenuating medium;
   (4) an image sensor positioned to receive the electromagnetic radiation transmitted from the test part surface to be gauged and which passes back through the attenuating medium, whereby an image of the test part surface to be gauged is formed, the intensity of the transmitted radiation varying across the image as a function of the deviation of the test part surface from the preselected nominal surface geometry;
   (5) a digitizer for converting the image from the image sensor into digital signals indicative to the intensity of the radiation at locations of the image;
   (6) digital electronic storage coupled to the digitizer for receiving and storing the digital signals; and
   (7) a calibration arrangement for correcting errors in the image formed by the image sensor, including means for producing a set of correction data and for altering the digital signals in accordance with the correction data.

2. A system as defined in claim 1, wherein the attenuating medium includes a material for attenuating the electromagnetic radiation as a function of distance the electromagnetic radiation travels through the attenuating medium.

3. A system as defined in claim 2, wherein the attenuating medium is a liquid containing a dye and the electromagnetic radiation is in the visible range.

4. A system as defined in claim 2, wherein the attenuating medium is conductive to microwave radiation and the electromagnetic radiation is in the microwave range.

5. A system as defined in claim 1, wherein the surface of the test part has low reflectivity and the attenuating medium contains a fluorescent dye responsive to the electromagnetic radiation from the electromagnetic radiation source.

6. A system as defined in claim 1, wherein the attenuating medium contains a photochromic dye having attenuation characteristics that vary as a function of the intensity of the electromagnetic radiation.

7. A system as defined in claim 1, wherein the image sensor is a CCD sensor having a matrix of image sensing elements in a row-and-column array, each of the image sensing elements receiving a corresponding location of the image such that the resolution of the system depends upon number, size, and spacing between the image sensing elements.

8. A system as defined in claim 7 further comprising a translator for moving the image sensor relative to the master surface so as to vary the resolution of the system.

9. A system as defined in claim 1, wherein the calibration arrangement includes:
   (1) one or more filters which can be positioned in the light path between the electromagnetic radiation source and the image sensor in order to vary the wavelength of light collected at the image source;
   (2) means for storing digital signals from the image sensor at a minimum of two different wavelengths;
   (3) means for calculating calibration signals based on the digital signals stored from the different wavelengths measurements; and
   (4) means for storing the calibration signals;
   whereby the calibration signals can be used to correct for non-uniform reflectivity from the surface of the test part.

10. A system as defined in claim 1, wherein the calibration arrangement includes:
    (1) means for measuring and storing the intensity of the radiation reflected from the test surface at each image location without any attenuating medium present; and
    (2) means for using the measured reflection at each image location to correct the measurement made with the attenuating medium present.

11. A system as defined in claim 1, wherein the calibration arrangement includes:
    (1) a standard test part having the preselected nominal surface geometry and uniform reflectivity positioned on the master surface;
    (2) means for storing digital signals from the image sensor indicative of intensity of light reflected by the standard test part;
    (3) means for calculating calibration signals based on the digital signals stored from the standard test part measurement; and
    (4) means for storing the calibration signals;
    wherein the calibration signals can be used to correct for non-uniform illumination of the test part surface.

12. A system as defined in claim 1, wherein a screen display is coupled to the digital electronic storage for displaying the deviations from the preselected nominal surface geometry of the test part.

13. A system as defined in claim 1, wherein the test part is supported on the master surface by a plurality of shims where at least one of the shims has a calibration groove or slot of precisely known depth.

14. A system as defined in claim 13, wherein the master surface is an optical flat and the system is used to determine the flatness of the test part.

15. A system as defined in claim 13, wherein the master surface is a glass plate which is calibrated using a standard optical flat test part and the system is used to determine flatness of the non-standard test part.

16. A method of gauging deviations of a surface on a test part from a preselected nominal surface geometry using electromagnetic radiation and a master surface that is essentially transparent to the electromagnetic radiation and that contains a substantially matched surface of the preselected nominal surface geometry, said method comprising:
    (1) forming an attenuating medium layer on the master surface;
    (2) placing the test part on the attenuating medium layer such that the surface of the test part is opposed to the corresponding matched surface of the master surface and such that substantially all spaces to be gauged between the test part surface and the master surface are essentially filled with attenuating medium;

(3) passing electromagnetic radiation into the attenuating medium in the direction of the test part surface;

(4) collecting the electromagnetic radiation which is transmitted from the test part surface and which passes back through the attenuating medium to form an image of the transmitted electromagnetic radiation;

(5) digitizing the image of the transmitted electromagnetic radiation;

(6) storing the digitized image in an electronic storage device associated with a computer;

(7) determining the deviations of the surface of the test part from a preselected nominal surface geometry, whereby the intensity of the transmitted electromagnetic radiation varies across the image as a function of the deviation of the test part surface from the preselected nominal surface geometry;

(8) producing a set of correction data related to errors in the digitized image; and, (9) altering the digitized image in accordance with the correction data.

17. A method as defined in claim 16, wherein the attenuating medium includes a material for attenuating the electromagnetic radiation as a function of the distance the electromagnetic radiation travels through the attenuating medium.

18. A method as defined in claim 17, wherein the attenuating medium is a liquid containing a dye and the electromagnetic radiation is in the visible range.

19. A method as defined in claim 17, wherein the attenuating medium is conductive to microwave radiation and the electromagnetic radiation is in the microwave range.

20. A method as defined in claim 17, wherein a camera is used to collect the electromagnetic radiation transmitted from the attenuating medium.

21. A method as defined in claim 20, wherein the camera is a CCD sensor having a matrix of usage sensing elements in a row-and-column array, each of the image sensing elements receiving a corresponding location of the image such that the resolution depends upon number, size, and spacing between the image sensing elements.

22. A method as defined in claim 21, wherein the camera is movable relative to the matter surface so as to vary the resolution.

23. A method as defined in claim 16, wherein the surface of the test part has low rejectivity and the attenuating medium contains a fluorescent dye responsive to the electromagnetic radiation.

24. A method as defined in claim 16, wherein the attenuating medium contains a photochromic dye having attenuation characteristics that vary as a function of the intensity of the electromagnetic radiation.

25. A method as defined in claim 16, wherein steps (8) and (9) are performed by:
   (1) positioning one or more filters in the electromagnetic radiation path in order to vary the wavelength of the electromagnetic radiation collected to form the image;
   (2) storing the digital signals collected at a minimum of two different wavelengths;
   (3) calculating calibration signals based on the digital signals stored from the different wavelengths measurements; and
   (4) storing the calibration signals;
whereby the calibration signals are used to correct for non-uniform reflectivity from the surface of the test part.

26. A method as defined in claim 16, wherein steps (8) and (9) are performed by:
   (1) measuring and storing the intensity of the radiation reflected from the test surface at each image pixel location without any attenuating medium present; and
   (2) using the measured reflection at each image pixel location to correct the measurement made with the attenuating medium present.

27. A method as defined in claim 16, wherein steps (1) and (2) are performed by:
   (1) positioning a standard test part having the preselected nominal surface geometry and uniform reflectivity on the master surface;
   (2) storing digital signals from the collected electromagnetic radiation indicative of intensity of light reflected by the standard test part;
   (3) calculating calibration signals based on the digital signals stored from the standard test part measurement; and
   (4) storing the calibration signals;
whereby the calibration signals are used to correct for non-uniform illumination of the test part surface.

28. A method as defined in claim 16, wherein the deviations from the preselected nominal surface geometry of the test part are displayed on a screen.

29. A method as defined in claim 16, wherein the test part is placed and supported on the master surface by a plurality of shims where at least one of the shims has a calibration groove or slot of precisely known depth.

30. A method as defined in claim 29, wherein the master surface is an optical flat and the method is used to determine the flatness of the test part.

31. A method as defined in claim 29, wherein the master surface is a glass plate which is calibrated using a standard optical flat test part and the method is used to determine flatness of the non-standard test part.

* * * * *

UNITED STATES PATENT AND TRADEMARK OFFICE
CERTIFICATE OF CORRECTION

PATENT NO. : 5,289,267
DATED : February 22, 1994
INVENTOR(S) : Busch, et al.

It is certified that error appears in the above-identified patent and that said Letters Patent is hereby corrected as shown below:

Claim 1, at column 15, line 29, replace "to" with --of--.

Claim 22, at column 17, line 48, replace "matter" with --master--.

Claim 23, at column 17, line 51, replace "rejectivity" with --reflectivity--.

Claim 27, at column 18, line 27, replace "(1)" with --(8)--.

Claim 27, at column 18, line 28, replace "(2)" with --(9)--.

Signed and Sealed this

Twenty-third Day of August, 1994

Attest:

BRUCE LEHMAN

*Attesting Officer*   *Commissioner of Patents and Trademarks*